United States Patent Office 3,315,974
Patented Apr. 25, 1967

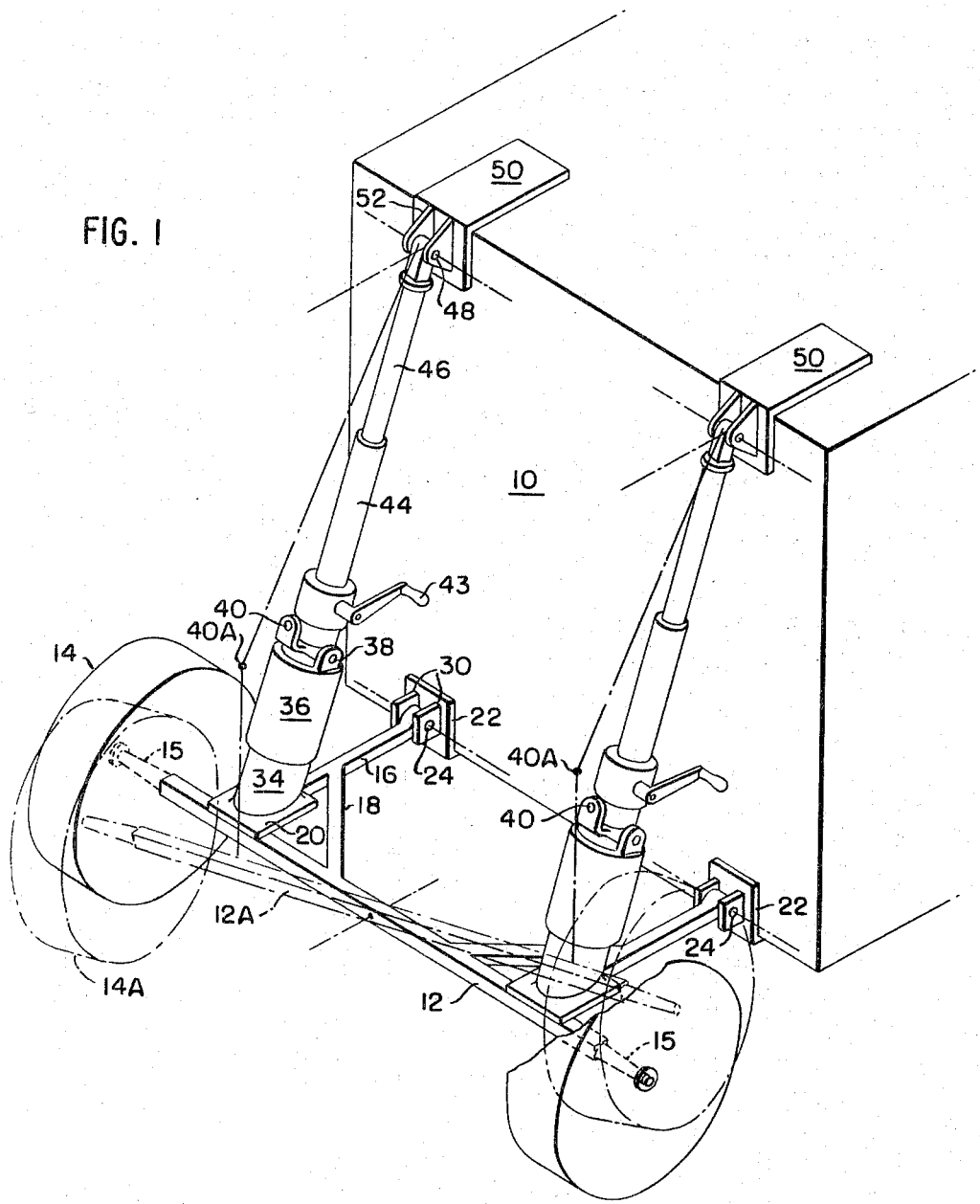

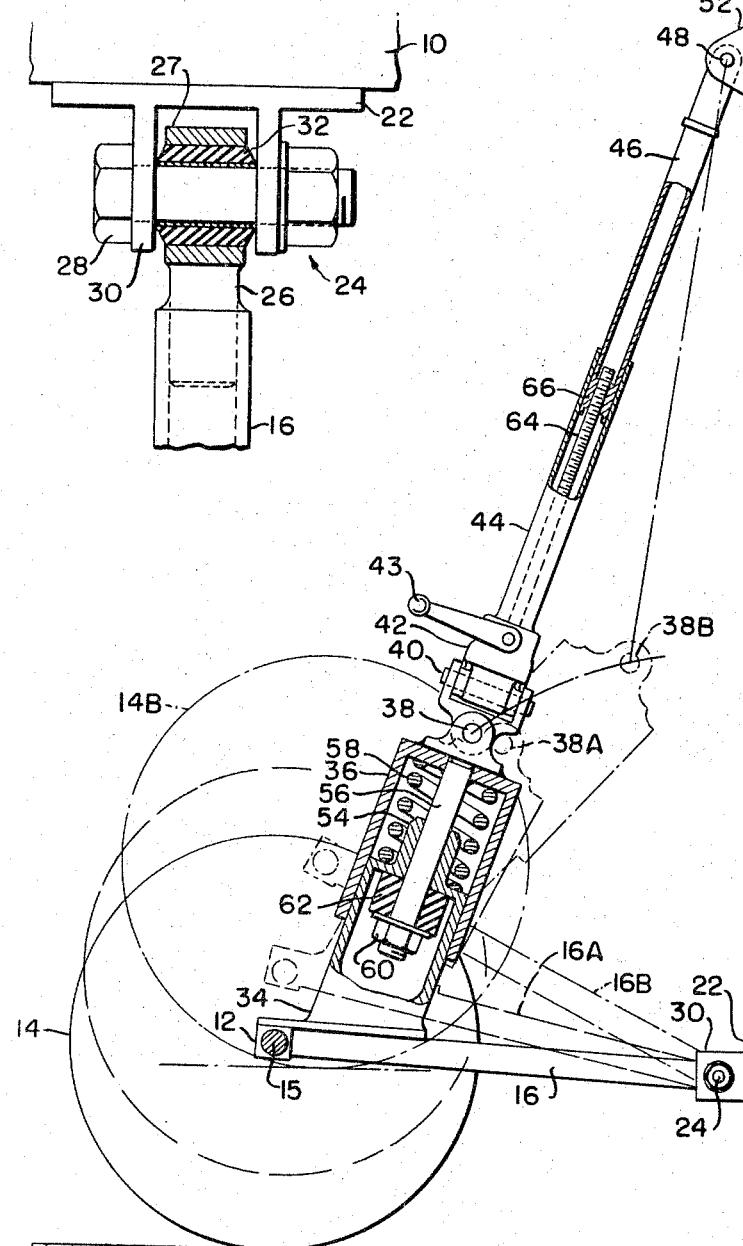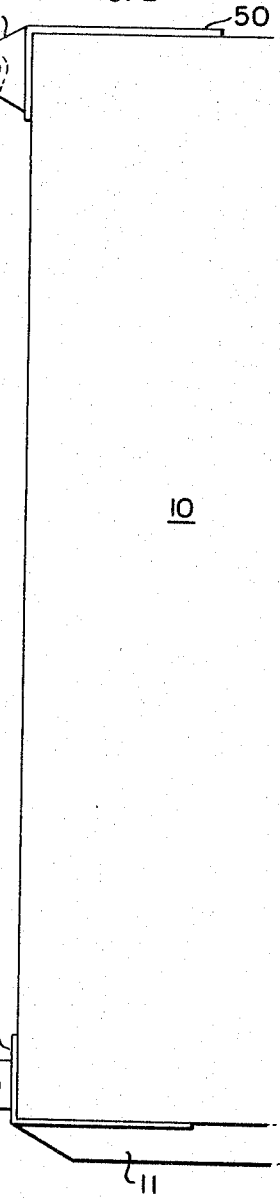

3,315,974
PORTABLE DOLLY WITH ARTICULATED ADJUSTABLE TRUSS
John R. Weaver, Jr., Rowley, and Charles E. Watt, Jr., Chelmsford, Mass., assignors to Craig Systems Corporation, Lawrence, Mass., a corporation of Massachusetts
Filed Nov. 26, 1965, Ser. No. 509,931
5 Claims. (Cl. 280—43.2)

This invention relates to an improved dolly for transporting shelters or other loads, and has as its primary object the provision of a lightweight and low-cost dolly structure having features previously available only in relatively heavy or complex structures. The improved dolly has the ability to adjust the elevation of the load relative to a supporting surface, so that the dolly may be attached while the load is resting on the surface, and then adjusted to elevate the load for transportation. Another feature of the dolly is the ability to tilt the load transversely relative to the supporting axle, so that the load may be leveled when supported on sloping terrain.

The improved dolly incorporates an axle for rotatably mounting conventional wheels, and an articulated truss which comprises a frame and a pair of adjustable legs. Both the frame and the legs are provided with means for pivotal connection of the dolly to the load at spaced points. The frame includes a pair of arms which may be rigidly affixed to the axle, and which extend in a generally horizontal plane to separate points of pivotal attachment to the load.

Each adjustable leg includes a longitudinally-extensible mechanical or hydraulic jack pivotally connected at one end to the load; a telescoping spring section attached at one end to the frame for cushioning the load against dynamic shocks applied to the load wheels; and a pivot joint interposed between the jack and the spring section. The pivot joint allows articulation of the leg about an axis substantially parallel to the axle. Thus, extension and contraction of either the jack or the spring section is accommodated by a folding or angulation of the adjustable leg at the pivot joint. The spring section comprises a pair of axially-telescoping members one of which is rigidly affixed to the frame, to form one member of a three-bar linkage in combination with the frame. The remaining members of the linkage are the load itself, and the jack.

The pivot joint is preferably universal, to allow articulation of the jointed sections of the legs about axes which are parallel to a tilting axis extending in the horizontal running direction of the load wheels, i.e. fore-and-aft of the dolly and the supported load. This permits a transverse tilting of the axle relative to the load by appropriate adjustment of the jacks in each leg of the truss, with a corresponding transverse folding or angulation of each leg. It is preferred to utilize loose pivot joints which allow tilting of the axle through angular movement of the legs and the arms of the frame about axes parallel to the fore-and-aft tilting axis, as well as relative vertical movement of the parts. These joints may simply comprise loose pin and clevis joints, or may incorporate compressible rubber collars to damp the transmission of shock loads. The limiting tilting angle may be increased if there is racking or twisting deflection of the frame, and this can be achieved by using a frame structure which is relatively flexible in this mode of deflection, provided the load to be carried will permit.

While the specification concludes with claims particularly pointing out the subject matter of the invention, it is believed that a clearer understanding may be gained from the following detailed description of a preferred embodiment, referring to the accompanying drawings, in which:

FIG. 1 is a pictorial view showing one of the improved dollies mounted on one end of a typical load;
FIG. 2 is a view in side elevation and partially in section of the dolly; and
FIG. 3 is a fragmentary plan view, partially in section, of a resilient pivotal connection between the dolly and the load.

In the drawings, a preferred embodiment of the dolly is shown mounted on one end of an illustrative load comprising a shelter 10, which is mounted at either end on a pair of the dollies for transport. Loads suitable for transport by these dollies must be provided with supports having sufficient structural strength to be attached to the dollies at four support points at either end. The illustrated shelter has conventional longitudinal skids 11 secured to its base.

An axle 12 is adapted to rotatably mount a pair of road wheels 14 on bearings 15 at either end of the axle. The dolly shown is nonsteerable, and would generally be used at the rear end of the load. A dolly for use at the forward end would have a conventional steering axle, modified to incorporate steering knuckles, and a transverse steering linkage coupled to a tow bar. These means are conventional, and no further description thereof is believed necessary. The axle is united with a flat frame comprising arms 16 and braces 18, by welding or by means of bolts. The frame structure is constructed of channel bars, and may be made sufficiently flexible to twist or rack somewhat from its undistorted form if the load to be carried will permit, in order to increase the limiting degree of lateral tilting of the axle. The axle is shown tilted to an exaggerated degree at 12A in FIG. 1.

The arms 16 are connected by pivot joints 24 to brackets 22, for attachment at laterally-spaced points to the base of the shelter 10. The brackets 22 are provided with ears 30 to form the pivotal connection, which is shown in more detail in FIG. 3. Each channelled arm 16 has an extension 26 welded therein; the extension terminates in an eye 27, through which a bolt 28 passes loosely to secure the arm pivotally in the ears 30. A rubber bushing 32 is interposed between the bolt and eye to dampen shock. The vertical and twisting movements of the arms which are permitted by these joints provide for the angular movement of the frame required in lateral tilting of the axle.

The adjustable articulated truss is completed by a pair of adjustable legs, each comprising a spring-loaded section formed by telescoping tubular members 34 and 36; a pair of pivot joints 38 and 40 forming a universal joint; an extensible jack including a gearhead 42 and relatively-slidable tube members 44 and 46; and a pivot joint 48 for connection to the shelter. Pivotal connection is made to the ears 52 of brackets 50, and may once again comprise a loose joint to facilitate the angular and vertical movements involved in tilting the axle. The brackets 22 and 50 are secured by bolts or other suitable means (not shown) to the shelter.

The spring-loaded section of each leg encloses a compression spring 58 between the members 34 and 36 for resilient wheel and axle movement relative to the shelter. The telescoping movements of the members 34 and 36 are restricted to the spring axis, both by the close fit between these members, and by a guide pin 56 which is welded concentrically within the member 36. This pin is slidably received within a plain sliding bearing 54 formed in the upper end of the member 34, and is held in assembly by means of a nut 60. A rubber bushing 62 is provided to cushion the dolly against shock upon the sudden release of dynamic loads applied to the road wheels.

The illustrated mechanical jack includes telescoping tubular members 44 and 46, the latter of which has a threaded portion 66, which may comprise a captured nut. The nut is engaged with an elongated screw 64 which extends from the gearhead 42 through the length of the tube 44. A hand crank 43 serves to revolve the screw through a conventional gear drive (not shown) contained in the head 42, thereby drawing the nut 66 along the screw to adjust the length of the leg.

At the lower end of each leg, the telescoping member 34 is welded to a plate 20 which is similarly secured to the frame. The angle of inclination of the leg relative to the frame is such that in the fully elevated position of the shelter, the arms 16 are substantially horizontal, and the leg has a maximum lever arm about the transverse pivot axis at 24. By adjustment of the jacks, the arms 16 may be shifted to a position 16B such that the wheels at 14B are elevated from the ground and the shelter rests on its skids 11. In this position, a dolly may be attached or detached at each end of the shelter by one person. Inasmuch as the telescoping members 34 and 36 maintain a fixed angle relative to the arm 16, the adjustable legs fold or angulate about the joints 38, which assume positions 38B when the jacks are fully contracted. Similarly, contraction of the springs 58 results in folding movement of the legs, and positions 38A are assumed by the pivot joints when the springs are substantially fully compressed. Corresponding positions of the arms are indicated at 16A.

As shown in FIG. 1, lateral tilting of the axle is also accompanied by a folding movement of the legs in a transverse direction, and this is accommodated by the pivot joints 40. The axle is shown tilted to an exaggerated degree for greater clarity, with the joints in positions 40A and the location of the leg elements indicated in dotted lines.

It will be understood from the foregoing description that the improved dolly provides both for adjustment of the elevation of the supported load, and for leveling of the load on sloping terrain, through appropriate adjustments of the jacks in each leg. While a preferred embodiment has been described by way of illustration, it will be apparent to those skilled in the art that various changes and modifications may be made therein without departing from the true spirit and scope of the invention. For example, air cushion springs may be used in place of the illustrated coil springs. We therefore intend to define the invention in the appended claims without limitation to the details of the illustrated embodiment.

We claim:

1. A dolly for portably supporting a load at an adjustable elevation and lateral angle relative to a supporting surface, comprising: an axle adapted to mount wheels rotatably thereon; and an articulated adjustable truss including a frame attached to said axle and having means for pivotal connection to the load to locate said axle for arcuate movement about a first axis defined by said pivotal means, and a pair of adjustable legs affixed at first ends to said frame at points spaced apart longitudinally of said axle, said legs having means at second ends thereof for pivotal connection at spaced points to the load; each of said adjustable legs including jack means and spring-biased telescoping means each extensible longitudinally of the corresponding leg, and a pivot joint located intermediate said jack means and said telescoping means; said pivot joint being constructed and arranged to permit relative angular movement between said jack means and said telescoping means at least about an axis substantially parallel to said first axis; whereby extension and contraction of either leg is accompanied by articulation thereof and by angular movement of said axle about said first axis.

2. A dolly as recited in claim 1, in which said telescoping means of each leg comprises telescoping members constraining one another against relative movement other than along a telescoping axis, and compression spring means interposed between said members to resiliently oppose contraction of the corresponding leg.

3. A dolly as recited in claim 2, in which one of said telescoping members in each leg is affixed to said frame to define said telescoping axis.

4. A dolly as recited in claim 1, in which said pivot joint of each said leg is constructed and arranged to provide for relative angular movement between the corresponding jack means and telescoping means about an axis substantially normal to said first axis, whereby tilting of said axle transversely of the dolly is accompanied by articulation of each leg about said normal axis.

5. A dolly as recited in claim 4, in which said pivotal connection means are constructed and arranged to provide for limited tilting movement of said frame and said legs about axes normal to said first axis to facilitate transverse tilting of said axle.

References Cited by the Examiner
UNITED STATES PATENTS

| | | | |
|---|---|---|---|
| 2,008,887 | 7/1935 | Venables | 280—35 |
| 2,968,490 | 1/1961 | Baus | 280—35 |
| 3,131,950 | 5/1964 | Weaver et al. | 280—43.2 X |
| 3,156,484 | 11/1964 | Talbert | 280—35 |
| 3,189,363 | 6/1965 | Pierrat | 280—35 |

MILTON BUCHLER, *Primary Examiner.*

C. C. PARSONS, *Assistant Examiner.*